UNITED STATES PATENT OFFICE.

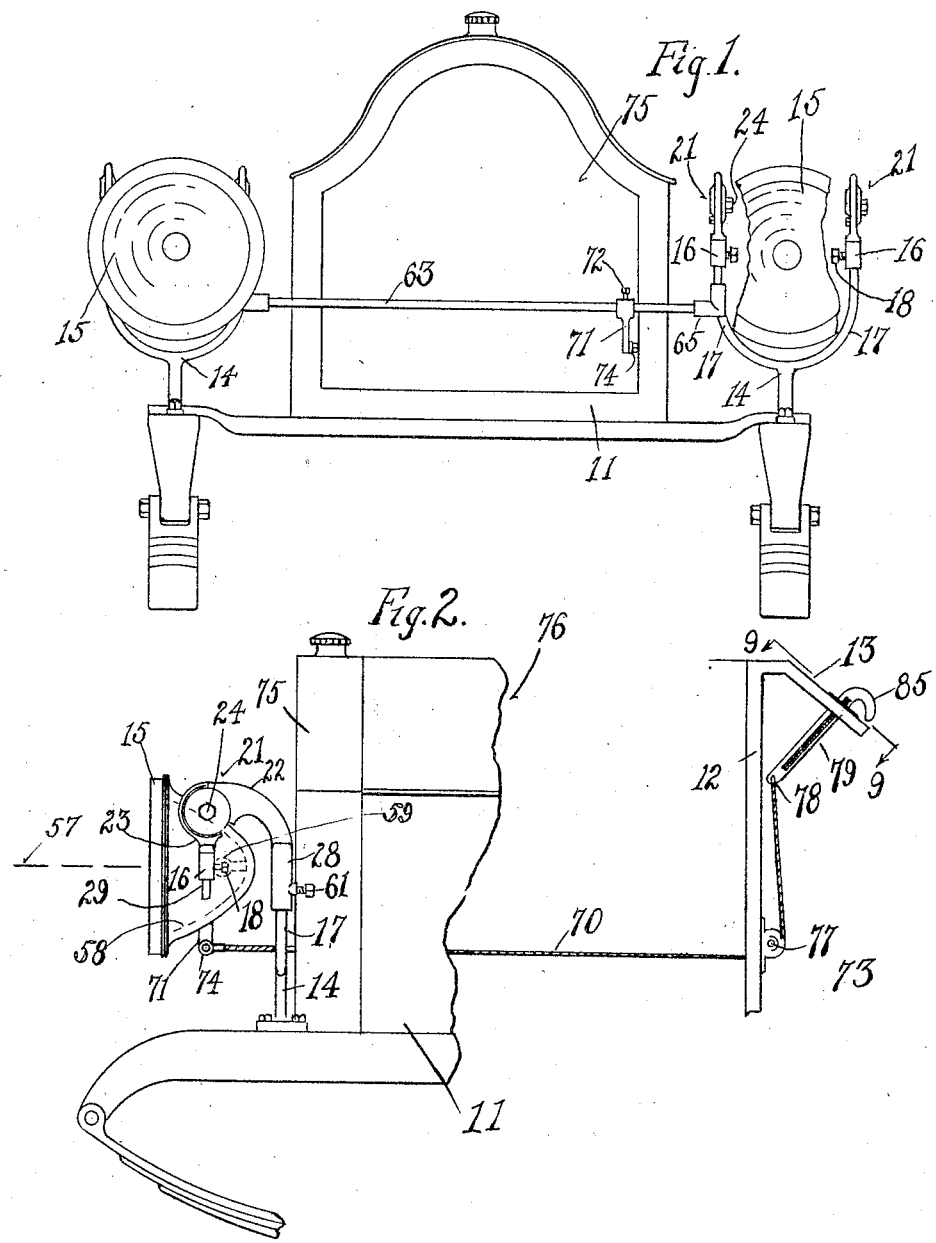

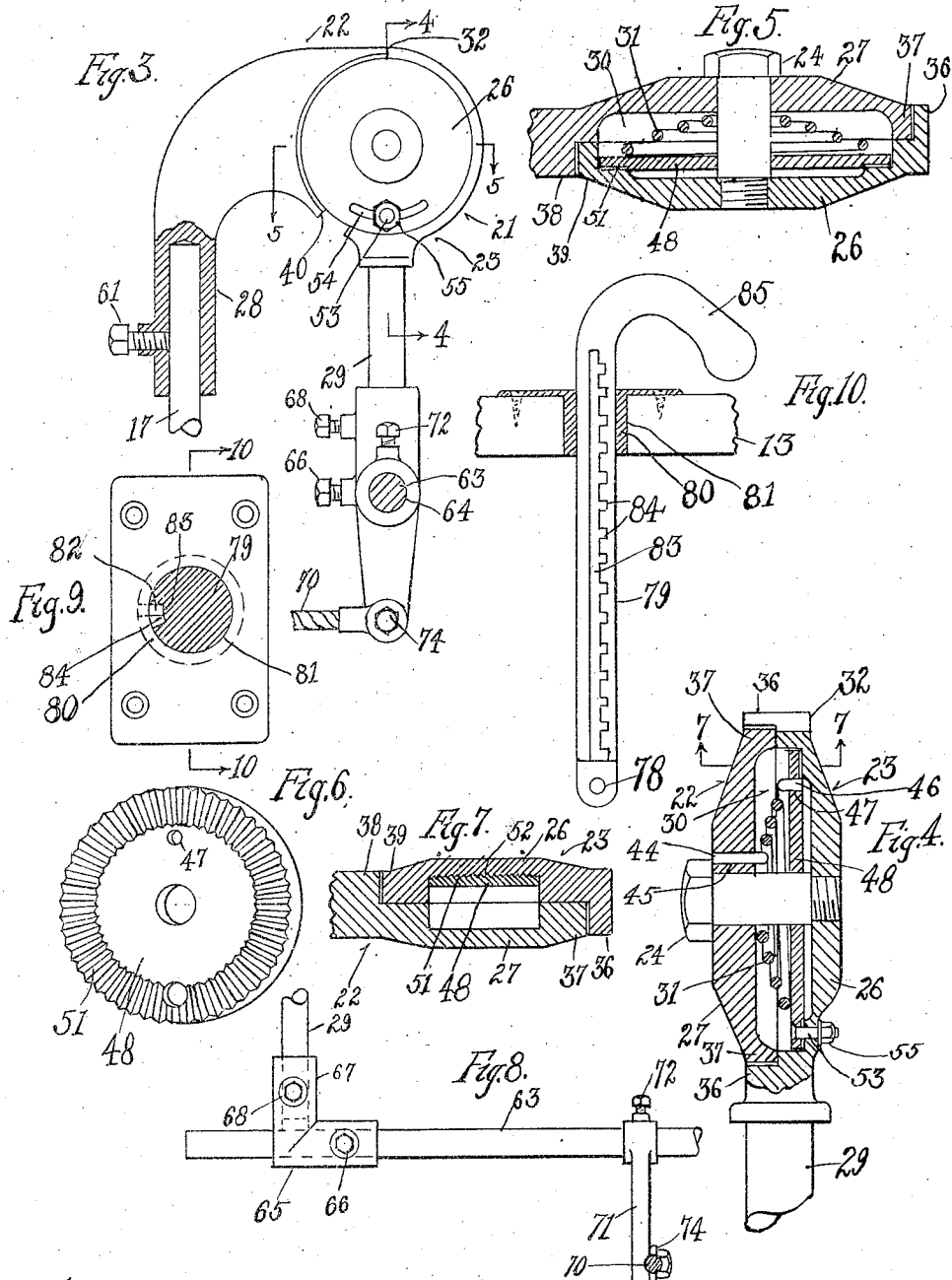

JAMES J. SEXTON AND REYNOLD E. KLAGES, OF COLUMBUS, OHIO.

AUTOMOBILE-HEADLIGHT CONTROL.

1,231,076. Specification of Letters Patent. Patented June 26, 1917.

Application filed October 29, 1915. Serial No. 58,641.

*To all whom it may concern:*

Be it known that we, JAMES J. SEXTON and REYNOLD E. KLAGES, citizens of the United States, residing at Columbus, in the county of Franklin and State of Ohio, have invented certain new and useful Improvements in Automobile-Headlight Control, of which the following is a specification.

In automobiling it is desirable to at times have the rays of light from the headlight projected with intensity straight ahead, as when traveling along country roads or sparsely settled districts, and to at other times avoid the forward projection of intense rays of light, as when traveling along city streets or when passing an approaching vehicle, so as to avoid the confusion of pedestrians or the drivers of approaching vehicles by blinding.

It is the object of our invention to provide novel means whereby the full intensity of light may be maintained at all times and the rays of light projected downwardly when it is desired to avoid the direct forward projection of the rays of light.

It is a further object of our invention to provide novel means which may be readily attached to the existing posts or forks on automobiles and to the usual securing means for the headlights for properly holding the headlight in suspended position.

The headlights on automobiles are subjected to severe jars and to the constant vibrations of the automobile in passing over ruts and unevennesses of streets and roads, the directions of these vibrations being mainly up and down. It is the object of our invention to provide means whereby to suspend the headlight and to swing the headlight pendulumwise for projecting its rays of light downwardly in front of the automobile, the point of suspension of the headlight being in such relation thereto as to resist up and down vibration with relation to the automobile; further to provide novel means whereby the headlight is resiliently held in normal position; further to provide means for swinging the headlight pendulumwise on its suspension pivot; further to provide means for automatically returning the headlight to normal position, and, further, to provide means whereby the resilient resistance to change the position of the headlight from normal position may be adjusted, and the invention will be further readily understood from the following description and claims, and from the drawings, in which latter:

Figure 1 represents a front elevation of so much of an automobile as is necessary to illustrate our invention, showing our invention applied thereto, the headlights being partly broken away for better illustration of parts.

Fig. 2 is a side elevation of the same, the automobile and headlight being partly broken away for better illustration of parts.

Fig. 3 is an enlarged side elevation, partly in section, showing the suspension means of our improved device.

Fig. 4 is a vertical axial section of the same taken on the line 4—4 of Fig. 3.

Fig. 5 is a horizontal axial section of the same taken on the line 5—5 of Fig. 3.

Fig. 6 is a perspective view of the adjusting disk for the spring.

Fig. 7 is a cross-sectional detail on the line 7—7 of Fig. 4.

Fig. 8 is a rear elevation showing a detail of the connecting means for the combined movements of the headlight.

Fig. 9 is a detail of the headlight shifting means in section on the line 9—9 of Fig. 2; and, Fig. 10 is an axial section of the same taken on the line 10—10 of Fig. 9.

11 represents the body of an automobile instanced as having a dash-board 12 and a canopy 13 above the dash-board. Automobiles are usually provided with headlight supporting means in the form of posts or forks. We have instanced such means as the forks 14, 14. Headlights are exemplified at 15, 15, the headlights in the present exemplification being provided with usual sockets 16 adapted ordinarily to be received over the posts 17 of the forks and to be secured thereto by set-bolts 18.

In the present invention a suspension device for the headlight is provided between the posts and the headlight, exemplified generally at 21. The suspension-device comprises the members 22, 23, pivoted together, as by means of a bolt 24.

The members are exemplified as comprising plates 26, 27, from one of which a socket 28 extends and from the other of which a stem 29 extends. There is a cavity 30 between the plates in which a spring 31 is received, arranged to resiliently urge normal relation between the suspension members.

This normal relation is exemplified as a parallel relation between the socket 28 and the stem 29, determined by a stop 32.

The plate 26 is provided with a flange 36 in which the edge 37 of the plate 27 is received, and the plate 27 is provided with a flange 38 in which the edge 39 of the plate 26 is received. The normal meeting ends of the flanges are shown as forming the stop 32. The other ends of the flanges may be arranged to abut to form a stop 40 for limiting the downward deflection of the headlight.

Means are provided for adjusting the tension of the spring 31, accomplished by receiving one end 44 of the spring in a hole 45 in the plate 27 and receiving the other end 46 of the spring in a hole 47 of an adjustable disk 48. The disk is located in the cavity 30 between the plates 26 and 27.

In the present exemplification the disk is provided with an annular row of serrations or teeth 51 and the inner face of the plate 26 is provided with a coacting annular row of serrations or teeth 52, which aid in maintaining the disk in adjusted position with relation to said plate 26.

The fastening of the disk to the plate in adjusted position may be accomplished by providing the disk with a bolt 53 received through a slot 54 in the plate 26, a jam-nut 55 being received over the bolt for clamping the disk in adjusted position. The coacting serrations or teeth may, if desired, be urged into coacting relation by forming the spring 31 as a volute spiral spring, so that the same will have resilience not only about its axis but also lengthwise of its axis. The volute spring urges separation between the plate 27 and the disk 48 for causing coaction between the serrations or teeth 51 and 52.

The socket 28 is arranged to be received over the usual post and is arranged to be clamped thereon by means of a set-screw 61. The stem 29 is arranged to be received in the socket of the headlight and to be clamped therein by the set-bolt 18 for securing the headlight to the automobile.

In our improved device the headlight is preferably so hung as to be suspended from a pivot above the line of the principal axis of the reflector, exemplified at 57, with relation to the reflector 58 of the headlight 15, the light-bulb for which is shown at 59, the greater part of the weight of the headlight being below the pivotal axis of the suspension-device, for suspending the headlight pendulumwise from its pivotal axis.

The normal position of the headlight is preferably such that the rays will be projected straight ahead, from which normal position the change of position of the headlight for downward projection of the rays is accomplished.

When a forked attachment is employed one of our improved suspension devices is employed at each side of the headlight, the construction being such that any variation in the distance between centers of the sockets of the headlight and the centers of the posts of the fork are accommodated by the interposition of the suspension-members.

When a pair of headlights is employed, we prefer to connect the sustaining means for the headlight, so as to operate them together, accomplished, for instance, by means of a cross-rod 63 received in or through sockets 64 of connecting-pieces 65, and rigidly secured therein by set-bolts 66, the stems 29 of the inner ones of the sustaining members being received in sockets 67 of said connecting-pieces and rigidly secured therein by set-bolts 68.

A tension-member 70 is arranged to pull the headlights out of normal position. It is secured to the cross-rod 63 by means of an arm 71 rigidly secured to the cross-rod by means of the set-bolt 72. This arm may be secured at any point lengthwise of the cross-rod, either between the connecting pieces 65 or outside said connecting-pieces, and the tension-member preferably passes to the compartment 73 for the driver of the automobile. The tension-member is instanced as a cable connected with the arm at 74 and passing through the radiator 75 and the motor-compartment 76 of the automobile over a pulley 77 journaled to the body of the automobile and having connection at 78 with a pull-piece 79.

This pull-piece is instanced as passing through a bearing 80 secured in a hole 81 of the canopy 13, and arranged to be adjustably held to the bearing, as by means of providing the bearing with a pin 82 lengthwise of which a slot 83 in the pull-piece is arranged to move when sliding the pull-piece axially, the pin being received in recesses 84 extending from the slot for holding the pull-piece in adjusted positions. The pull-piece is provided with a suitable handle 85 for pulling and turning the same.

If it is desired to tilt the headlight so as to project its rays downwardly, as when traveling along city streets or when passing approaching vehicles or pedestrians, the pull-piece is pulled upon, thereby tilting the headlight, the pin 82 being received in a suitable recess 84 for determining the inclination of the rays of light downwardly. If it is desired to again project the rays of light straight ahead, the pull-piece is released, whereupon the spring 31 will return the headlight to normal position for coaction of the stop 32, the spring maintaining the headlight in such normal position throughout the time that it is desired to project the light straight forwardly.

In our improved device the headlight has return movement to normal position imparted thereto by gravity, thus decreasing the duty of the spring, which exerts its force to maintain the headlight in normal position.

The principal vibrations of the lamp are up and down and the pivotal axes of the suspension-devices are in the lines of force of said vibrations, whereby vibration of the headlight on the automobile will be resisted by connections which are unyielding in the direction of the lines of force of said vibrations.

Our improved device therefore provides a structure whereby vibration of the headlight other than that of the vehicle is substantially avoided.

Having thus fully described our invention, what we claim as new and desire to secure by Letters Patent, is:

1. The combination with a headlight support and a headlight, of a suspension-device for said headlight interposed between said support and said headlight, said suspension-device comprising an upwardly extending member arranged for being secured to said support, and a downwardly extending member arranged for having said headlight secured thereto, the upper portions of said members pivoted together on a pivot located above the greater portion of the weight of said headlight attached to said downwardly extending member, and means for moving said headlight on said pivot with relation to said support for adjusting the projection of the rays of said headlight up or down.

2. The combination with a headlight support and a headlight, of a suspension-device for said headlight between said support and said headlight, said suspension-device comprising an upwardly extending member arranged for being secured to said support, and a downwardly extending movable member arranged for having said headlight secured thereto, the upper ends of said members being pivoted together for suspending said headlight pendulumwise, with the greater portion of its weight below said pivot, a stop for limiting said pendulumwise movement of said headlight, and a spring normally urging coaction between said movable member and stop.

3. The combination, with an automobile and a headlight, of a headlight support, and a suspension-device for said headlight interposed between said support and said headlight, said suspension-device comprising a movable member to which said headlight is arranged to be secured for suspending said headlight pendulumwise, a stop, a spring normally urging coaction between said movable member and stop, and means for adjusting the inclination of said movable member with relation to the vertical.

4. The combination, with an automobile and a headlight, of a headlight support, and a suspension-device for said headlight interposed between said support and said headlight, said suspension-device comprising a movable member to which said headlight is arranged to be secured for suspending said headlight pendulumwise, a stop, a spring normally urging coaction between said movable member and stop, and means for adjusting the force of resilience of said spring.

5. In combination, with an automobile and a headlight, of a headlight support, and a suspension-device for said headlight interposed between said support and said headlight, said suspension-device comprising a pair of plates pivoted together and having a cavity therebetween, and a spiral spring in said cavity about the pivotal axis between said plates and having attachment with said respective plates, said headlight having attachment with one of said plates, and the other of said plates arranged to be secured to the automobile.

6. In combination, with an automobile and a headlight, of a headlight support, and a suspension-device for said headlight interposed between said support and said headlight, said suspension-device comprising a pair of plates pivoted together and having a cavity therebetween, a spiral spring and a disk in said cavity about the pivotal axis between said plates, said spring having attachment with one of said plates and with said disk, and means for adjustably securing said disk to the other of said plates, said headlight having attachment with one of said plates, and the other of said plates arranged to be secured to the automobile.

7. An automobile headlight control comprising a pair of members, one of said members provided with a downwardly extending socket arranged to be received about a post and the other of said members having a downwardly projecting stem extending therefrom arranged to be received in the socket of a headlight, a stop between said members for limiting separation between said stem and socket, a spring between said members for urging separation between said stem and socket, and means for relatively positioning said stem and socket.

8. An automobile headlight control comprising a pair of plates, one of said plates arranged for attachment to an automobile and the other of said plates arranged for attachment to a headlight, said plates pivoted together, said plates having a cavity between them, a spiral spring between said plates normally urging pivotal movement of said other of said plates in one direction, and means for shifting said other of said plates about its pivotal axis in the opposite direction.

9. An automobile headlight control comprising a pair of plates, one of said plates arranged for attachment to an automobile and the other of said plates arranged for attachment to a headlight, said plates pivoted together, said plates having a cavity between them, a spiral spring and a disk between said plates about the pivotal axis of said second-named plate, said spiral spring having attachment with one of said plates and with said disk, means for adjustably securing said disk to the other of said plates, said spring normally urging pivotal movement of said second-named plate in one direction, and means for shifting said second-named plate about its pivotal axis in the opposite direction.

10. An automobile headlight control comprising a pair of members, one of said members arranged for attachment to an automobile and the other of said members arranged for attachment to a headlight, said members pivoted together, said members having a cavity between them, and a volute spiral spring and a disk in said cavity between said members, one end of said spring having attachment with one of said members and the other end of said spring having attachment with said disk, said disk and the other of said members provided with coacting teeth for adjustably positioning said disk, and said coacting teeth urged into coacting relation by said spring.

In testimony whereof, we have hereunto signed our names in the presence of two subscribing witnesses.

JAMES J. SEXTON.
REYNOLD E. KLAGES.

Witnesses:
GEORGE L. MOONEY,
RUSSELL C. EVICK.